United States Patent [19]

Golde

[11] 4,216,557
[45] Aug. 12, 1980

[54] HONEYCOMB FRAME FOR BEEHIVES

[75] Inventor: Hans-Dieter Golde, Frankfurt, Fed. Rep. of Germany

[73] Assignee: Stapla Hans-Dieter Golde GmbH & Co KG, Rossbach v.D.H., Fed. Rep. of Germany

[21] Appl. No.: 947,455

[22] Filed: Oct. 2, 1978

[30] Foreign Application Priority Data

Nov. 5, 1978 [DE] Fed. Rep. of Germany ....... 2744741

[51] Int. Cl.³ ........................................... A01K 47/02
[52] U.S. Cl. ...................................................... 6/10
[58] Field of Search ...................... 6/2 R, 2 A, 10, 11; 40/154, 155

[56] References Cited

U.S. PATENT DOCUMENTS

| 128,072 | 6/1872 | Root et al. | 6/10 |
| 2,474,382 | 6/1949 | Smith et al. | 6/10 |
| 2,717,432 | 9/1955 | Willard | 6/10 X |
| 3,034,612 | 5/1962 | Jourdan | 40/155 X |
| 3,806,969 | 4/1974 | Varama | 6/10 |
| 4,077,075 | 3/1978 | Schade | 6/10 |

Primary Examiner—Louis G. Mancene
Assistant Examiner—Robert P. Swiatek
Attorney, Agent, or Firm—Toren, McGeady and Stanger

[57] ABSTRACT

A honeycomb frame for a beehive is formed of a plurality of sectional members injection molded of a plastics material. Each sectional member consists of an elongated flat bar integrally secured to a right-angled corner part. One part of the corner part is aligned with a flat bar and the other part extends perpendicularly to the flat bar. The other part of the corner part includes a sleeve portion into which the end of another flat bar is inserted.

14 Claims, 12 Drawing Figures

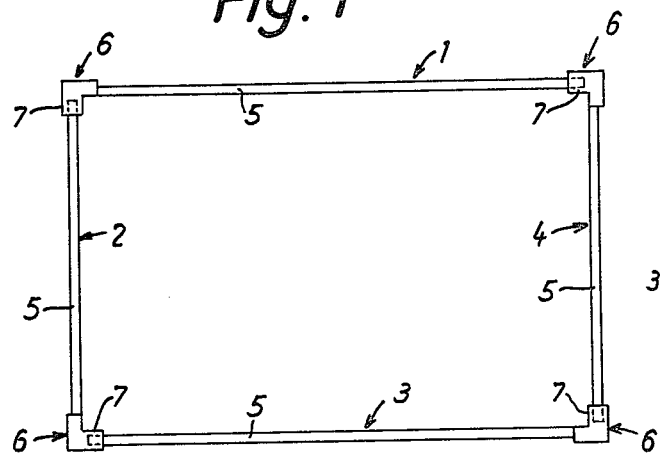
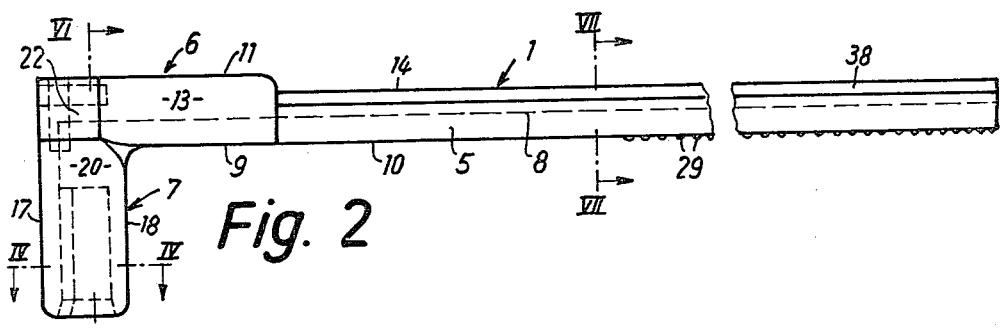
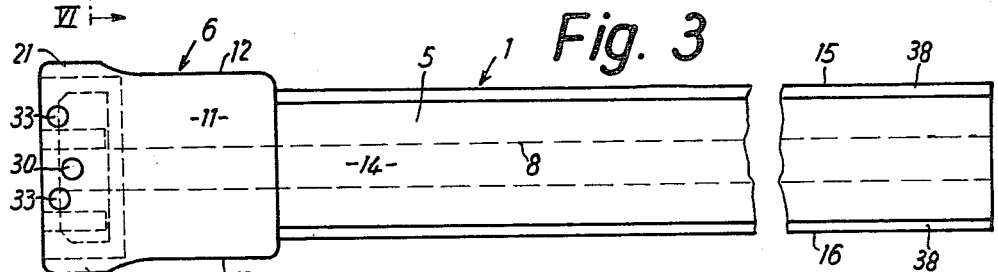
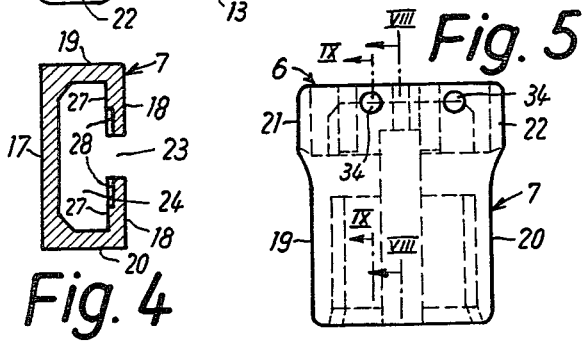
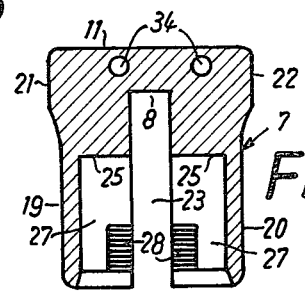

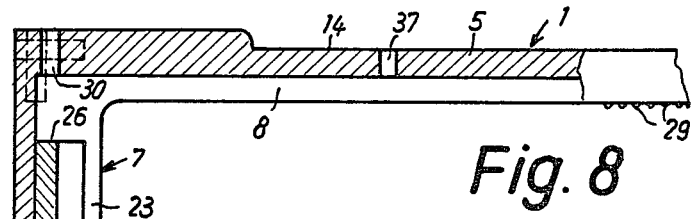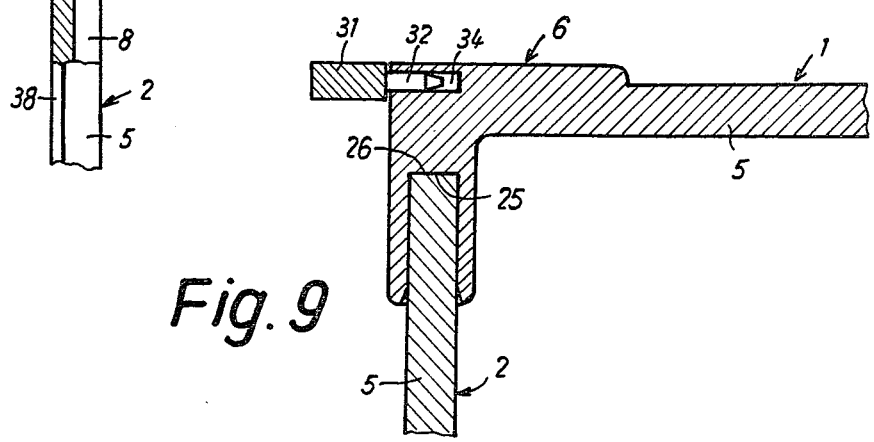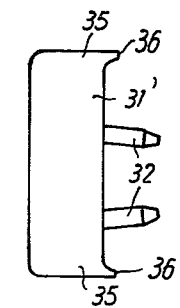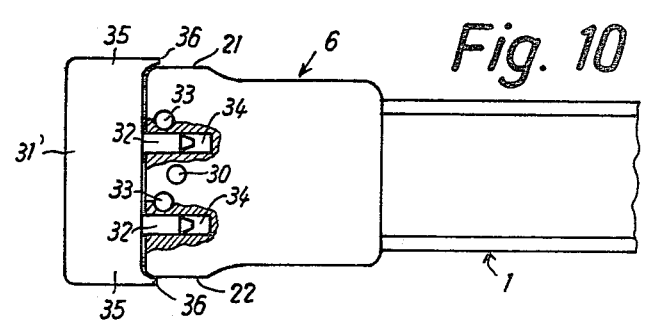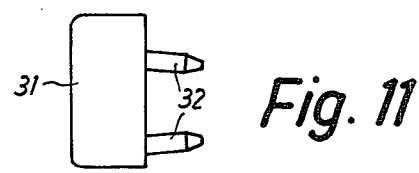

HONEYCOMB FRAME FOR BEEHIVES

SUMMARY OF THE INVENTION

The present invention is directed to a honeycomb frame for beehives and, more particularly, to a frame formed of plastics material sectional members fitted together at the corners.

As compared to conventional honeycomb frames made of wood, frames formed of plastics material have certain advantages, specifically they can be disassembled, have a long service life, are resistant to moisture, mold, fungus and insects, and, in some embodiments, can be adjusted to different sizes of beehives.

In a known honeycomb frame formed of plastics material, note German Offenlegungsschrift 26 29 858, sectional members can be fitted together and preferably are formed of C-shaped hollow sections and angular coupling members connect the ends of the sectional members together. In such a construction, each honeycomb frame requires at least eight individual parts, that is, four sectional members and four coupling members. In addition, at least two spacers must be placed on the outside of each honeycomb frame so that adjacent honeycomb frames in a multi-story hive have sufficient space between them. If plastic combs are mounted in this known frame, clamping ledges must be inserted into the hollow section for holding the combs. If wax combs are used, they are mounted by melting with resistance-heated wires located in the frame and no clamping ledges are needed. In such a construction, however, the undercut portions of the C-shaped hollow sections form dead zones which could collect undesirable deposits. The angular coupling members interconnecting the hollow sections do not provide securely fixed corner connections, since the sections are butt-jointed and, therefore, can easily slide relative to one another. Accordingly, there is the danger that the corners of the frame may open up during removal, especially when they are filled with honey. Furthermore, this danger also exists during centrifuging of the honey. While it would be possible to glue the corners in addition to the interfitting engagement provided, such glueing would eliminate the advantage of disassembling the honeycomb frame and, therefore, plastic combs could not be used.

The primary object of the present invention is to provide a honeycomb frame of the above type while avoiding the disadvantages experienced in the known constructions. In particular, it is the purpose of the invention to provide a frame formed of a minimum number of parts rigidly but detachably connected together at the corners and also to provide a frame which can use wax combs as well as plastic combs without needing additional parts. Another object is to provide a frame which can be adjusted for use in beehives of all sizes and one that is suitable for multi-story hives as well as for leaf-hives.

In accordance with the present invention, the honeycomb frame is formed of a plurality of sectional members each consisting of an elongated flat bar with a corner part formed integrally with it at one end. Each corner part has a sleeve portion extending perpendicularly to the flat bar and arranged to receive the end of another flat bar opposite the end having the corner part.

In accordance with the present invention, a rectangular honeycomb frame consists only of four parts, one fitted into the other and each of the same construction differing only in the lengths of the flat bars constituting the elongated portions of the sectional members. The length of each sectional member can be easily adjusted by cutting the flat bar to the desired dimension. Similarly, the honeycomb of the present invention can be adjusted to the varied dimensions of beehives. Because of their stable character, the corner connections safely prevent any undesirable movement between the interconnected sectional members. In a preferred embodiment especially suited for mounting plastic combs, the sectional members have a groove extending around the inner surface of the frame for receiving a honeycomb. The groove extends through the flat bar into the corner part and is in the form of a slot in the sleeve portion of the corner part. Accordingly, a continuous groove extending around the inner circumference of the honeycomb frame is provided in which the plastic combs can be securely held without any additional means.

The honeycomb frame of the present invention, however, is not limited to use with plastic combs. The frame can be adjusted in a simple manner for use with wax combs by forming bores in the section members with the bores extending from the outer surfaces of the members to the bottom of the groove formed in the inner surface. These bores can be used to pass wires through the frame for the honeycombs. These bores are arranged as rows of holes in the individual sectional members. Accordingly, the honeycomb frame of the present invention can be used without adjustments for both plastic and wax combs.

When the honeycomb frames of the present invention are used as insert frames for multi-story hives, it is advantageous if spacers are provided on both sides of the corner parts. This feature obviates the need of additional spacers.

In another embodiment of the honeycomb frame for use in multi-story hives, seating or bearing members can be attached to the corner parts either in line with the flat bar or with the sleeve portions of the corner part. As a result, each of the corner parts of a honeycomb frame can include bearing members each extending in a different direction and disposed perpendicularly to the other. Therefore, the individual sectional members are interchangeable with respect to the attachment of the bearing members.

Advantageously, each bearing member is provided with a pair of pins insertable into corresponding bores in the corner part. The connection of the bearing members to the corner parts is simple to effect and, additionally, functions safely. The bearing members including the pins can be extruded as a unit and the bores into the corner parts can be formed without any difficulty during injection molding.

Two pairs of the bores are provided in each corner part and staggered relative to one another so that the pins of the bearing members can be inserted without any mutual interference. As a result, the bores do not intersect and the effective contact length of the pins in the bores is not reduced.

For an especially reliable attachment of the bearing members into the corner parts, the pins on each bearing member converge inwardly toward one another as they extend outwardly from the bearing member. When the pins are inserted in the bores they are slightly elastically deformed and are secured in a prestressed manner.

When these honeycomb frames are used as insert frames in a multi-story hive, the distance between the frames can be adjusted in a simple manner with the bearings members projecting beyond the sides of the corner parts and, possibly, beyond spacers formed on the corner parts. As a result of this arrangement, the distance between the honeycomb frame can be adjusted to different methods of beekeeping or to natural conditions.

As a rule, the positive engagement obtainable by fitting the frame corners together is sufficient for all expected loads. The stability of the corner connections, however, can be increased by providing the sleeve portion of each corner part with a toothed rack which corresponds to complementary teeth formed on the flat bar of each additional member. This feature affords additional releasable clamping between the sectional members.

During beehive maintenance, particularly when exchanging honeycombs, the individual sectional members must be separated from one another. Separation also facilitates cleaning of the sectional members. When the sectional members are to be pulled apart, on one hand, friction must be overcome and this friction may be increased due to the above-mentioned toothed inter-engagement, and, on the other hand, it is frequently necessary to loosen agglutination. Accordingly, it is advantageous if each corner part has a discharge bore accessible from the exterior and opening into the bottom of the groove around the interior of the frame. The discharge bore is arranged so that it faces toward the end face of the flat bar of the adjacent sectional member which is inserted into the sleeve portion. When a suitable tool, for example, a round pin, is inserted into the discharge bore, the corner connection can be separated without destroying any of the parts of the frame by applying light blows to the round pins. It is also possible to provide a thread in the discharge bore so that disengagement can be effected by threading in a lifting screw.

Spacers are not required when the honeycomb frame of the present invention is used for leaf-hives. In such hives, however, it is advantageous to chamfer the edges of the sectional member at the junction of the outer surface and the opposite side surfaces.

The sectional members of the honeycomb frame embodying the present invention can be exactly and inexpensively produced from plastics material by injection molding. Further, it may be advantageous to use a foamed plastics material (rigid foam) in the injection molding operation for reducing the weight of the frames.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view of a honeycomb frame on a reduced scale as compared to the other figures;

FIG. 2 is a partial side view of a sectional member forming a part of the frame illustrated in FIG. 1;

FIG. 3 is a partial top view of the sectional member displayed in FIG. 2;

FIG. 4 is a sectional view taken along the line IV—IV in FIG. 2;

FIG. 5 is an end view of the corner part of the sectional member shown in FIG. 2;

FIG. 6 is a sectional view through the corner part taken along the line VI—VI in FIG. 2;

FIG. 7 is a sectional view of the flat bar of the sectional member taken along the line VII—VII in FIG. 2;

FIG. 8 is a sectional view taken along the line VIII—VIII in FIG. 5, however, another sectional member, shown only in part, extends into the corner part of the sectional member of FIG. 5;

FIG. 9 is a sectional view, similar to FIG. 8, taken along the line IX—IX in FIG. 5, with a bearing member inserted into the corner part;

FIG. 10 is a top view, similar to FIG. 3, however, with a bearing member secured to the corner part;

FIG. 11 is a top view of a bearing member; and

FIG. 12 is a top view of another embodiment of the bearing member.

DETAILED DESCRIPTION OF THE INVENTION

FIG. 1 illustrates a honeycomb frame consisting of four sectional members 1, 2, 3 and 4 fitted one into the other. Members 1 and 3 and members 2 and 4 have the same length so that a rectangular frame is formed. While one pair of the sectional members has a different length than the other pair, the sectional members 1, 2, 3 and 4 are otherwise completely identical, accordingly, in the following description only sectional member 1 will be described. As can be seen in FIG. 1, each sectional member consists of an elongated rectilinear flat bar 5 and a corner part 6 integrally connected to the flat bar so that a unitary member is provided. Each corner part is a right-angled element with one portion aligned with the flat bar and the other portion including a sleeve 7 disposed perpendicularly to the flat bar. Each flat bar has a first end and a second end with the first end formed integrally with the corner part and the second end inserted into the adjacent sleeve portion 7.

FIGS. 2-6 illustrate the construction of the corner part 6. As mentioned, the corner part is formed integrally with its associated flat bar 5 by means of injection molding, the shape of the flat bar is displayed in FIG. 7. In addition to its use for supporting a wax comb, the honeycomb frame is also arranged to support a plastic comb. The flat bar 5 of the sectional member 1 has a continuous groove 8 extending in the elongated direction of the bar with the groove continuing into the corner part, in particular note FIG. 8. The corner part 6 has an inner surface 9 flush with the inner surface 10 of the flat bar 5. The outer surface 11 and the side surfaces 12 and 13 of the corner part which extend between the inner and outer surfaces each project beyond the corresponding outer surface 14 and side surfaces 15 and 16 of the flat bar 5. Sleeve portion 7 of the corner part 6 has its outer surface 17 disposed perpendicularly to the outer surface 11. Similarly, the inner surface 18 of the sleeve portion 7 is disposed perpendicularly to the inner surface 9 of the part of the corner part formed integrally with the flat bar 5. The spacing between the side surfaces 19 and 20 of the sleeve portion 7, note FIG. 5, corresponds to the spacing between the side surfaces 12 and 13.

In the embodiment illustrated in FIGS. 2-6, spacers 21, 22 are formed on both of the side surfaces of the corner part 6 with the spacers projecting outwardly from the surfaces 12, 19 on one side of the corner part and from the surfaces 13, 20 on the opposite side of the corner part.

As indicated in FIGS. 4 and 6, a slot 23 is provided in the inner surface 18 of the sleeve portion 7. The width of the slot 23 corresponds to the width of the groove 8 and the slot 23 forms a continuation of the groove 8 at the corners of the frame, note FIG. 8. Accordingly, the combination of the groove 8 and the slot 23 affords a continuous opening in the inner circumference of the honeycomb frame for receiving a plastic comb, not shown.

Slot 23 divides the inner surface 18 of the sleeve portion 7 into two surfaces 27 of equal size. The dimensions and shape of the inner space 24 in the sleeve portion 7, note FIG. 4, are adapted to the cross-sectional shape and dimensions of the flat bar 5, note FIG. 7. The inner surface of the space 24 in the sleeve portion 7 includes two aligned surfaces 25, note FIG. 6, which form the stop surface for the end face 26 of the flat bar 5 of the sectional member 2 which is inserted into the sleeve portion 7 on sectional member 1, note FIG. 9.

The sectional members can be produced by injection molding with little variation in their dimensions so that the second end of each flat bar 5 can be adequately but detachably seated in the receiving spaces 24 in the sleeve portion 7 of the adjoining sections. Increased stability can be achieved, however, by providing toothed surfaces in the interconnecting parts. Accordingly, the inner surfaces 27 in the sleeve portion 7 bordering the slot 23 each have a toothed rack 28 and a complementary toothed rack 29 is provided on the inner surface 10 of the flat bar 5 along the opposite sides of the groove 8. The toothed racks 29 extend over a sufficient length of the flat bar 5 so that a section of these racks will remain after the flat bar has been cut to an appropriate length in forming a frame.

In the outer surface 11 of the corner part 6, a discharge bore 30 extends inwardly into the corner part so that a tool, for instance, a round pin, can be inserted into the discharge bore whereby it will reach the end face 26 of the flat bar 25 inserted into the sleeve portion 7. The parts forming the corner connection can be separated by applying light blows to the pin. This arrangement of the discharge bore can be best seen in FIG. 3 and FIG. 8.

Two embodiments of the bearing members 31, 31' which can be attached to the corner parts 6 are shown in FIGS. 11 and 12, respectively. The manner of attaching the bearing members is illustrated in FIGS. 9 and 10. The bearing member 31 displayed in FIG. 11 is essentially square and is provided on one long side with two pins 32 formed on and extending outwardly from the bearing member. These pins 32 are intended to seat into one of the pairs of bores 33, 34 formed in the corner part 6, note the bores 33 shown in FIG. 2 and the bores 34 shown in FIGS. 5 and 6. The bores 33 and 34 are staggered relative to one another in the outer right-angled surfaces of the corner part so that the bores do not intersect inwardly from the outer surface. The eccentricity relative to the center axis of the sectional member resulting from the staggered arrangement is taken into account by a corresponding eccentric arrangement of the pins 32 on the bearing member 31. Depending on the location of the finished frame in the beehive, the bearing members 31 can be attached to the corner part 6 by inserting the pins 32 into either of the pair of bores 33 or 34. The eccentricity of the pins 32 and of the bores 33 and 34 can be accommodated by turning the bearing member through 180° so that the member is symmetrically attached to the corner part.

As illustrated in FIG. 11, the axes of the two pins 32 converge slightly as they project outwardly from the body of the bearing member. As a result, when inserted into the bores 33 and 34, the pins are elastically prestressed and the bearing member is securely held by the corner part 6.

The embodiment of the bearing member 31' shown in FIG. 12 is basically the same as the embodiment shown in FIG. 11, however, the bearing member 31' has on two opposite surfaces extensions 35 which serve as spacers after the bearing member has been secured to the corner part. In this arrangement, the extensions 35 each include a projection 36 which embraces the spacers 21, 22, formed on the corner part 6, note FIG. 10.

To mount wires for the honeycombs, not shown, when the honeycomb frame is to be used with wax combs, each of the flat bars 5 of the sectional members are provided with a row of holes, only one of these holes 37 is shown in FIG. 8. The hole 37 extends from the outer surface of the flat bar into the bottom of the groove 8.

As shown in FIG. 7, chamfered surfaces 38 extend between the outer surface 14 and the side surfaces 15, 16 with the chamfered surfaces extending at a 45° angle to the adjacent surfaces.

While specific embodiments of the invention have been shown and described in detail to illustrate the application of the inventive principles, it will be understood that the invention may be embodied otherwise without departing from such principles.

What is claimed is:

1. Honeycomb frame for beehives comprising a plurality of sectional members interconnected to form the frame, wherein the improvement comprises that each said sectional member comprises an elongated flat bar having a first end and a second end, and a substantially right angle corner part integrally secured to and aligned with and extending from the first end of said flat bar, said corner part including a sleeve portion extending substantially perpendicularly to the portion of said corner part aligned with said flat bar and arranged to receive and hold the second end of the flat bar of another said sectional member, each said flat bar and corner part has an inner surface facing into the interior of the frame and an oppositely facing outer surface, said flat bar has a continuous groove in the inner surface thereof extending in the elongated direction of said flat bar and said corner part has a groove in the inner surface thereof in the portion aligned with said flat bar and forming a continuation of the groove in said flat bar and a slot formed in the inner surface of said sleeve portion with said slot forming a continuation of the groove in said flat bar and said corner part, each said corner part has a pair of spaced side surfaces extending between the inner and outer surfaces thereof and each of said side surfaces having a spacer surface thereon projecting outwardly from said side surface.

2. Honeycomb frame for beehives, as set forth in claim 1, wherein said flat bar has a plurality of bores therein extending transversely of the elongated direction of said flat bar and extending from the outer surface of said flat bar into said groove therein.

3. Honeycomb frame for beehives, as set forth in claim 1, wherein a bearing member is secured to the outer surface of said corner part in alignment with one part of said sleeve portion and the portion of said corner part aligned with said flat bar.

4. Honeycomb frame for beehives, as set forth in claim 3, wherein each said bearing member has a pair of pins secured thereto and projecting outwardly therefrom with said pins disposed in spaced relation, said corner part having at least one pair of spaced bores therein extending inwardly from the outer surface thereof and arranged to receive said pins on said bearing member.

5. Honeycomb frame for beehives, as set forth in claim 3, wherein each said corner part has a right-angled outer surface with one part of said outer surface extending generally perpendicularly to the other part thereof, each part of the outer surface having a pair of spaced bores therein extending inwardly from the outer surface thereof and arranged to receive said pins on said bearing member, a pair of said bearing members each having a pair of spaced pins secured thereto and projecting outwardly therefrom and each pair of said pins arranged to fit into a different one of said pairs of bores in said corner part.

6. Honeycomb frame for beehives, as set forth in claim 5, wherein the axes of one said pair of bores in said corner part being staggered relative to the axes of the other said pair of bores so that the pins of said pair of bearing members can be inserted into the bores without interfering with one another.

7. Honeycomb frame for beehives, as set forth in claims 4 or 5, wherein said pins on each said bearing member have the axes thereof in slightly converging relation as said pins project outwardly from said bearing member.

8. Honeycomb frame for beehives, as set forth in claims 4 or 5, wherein each said bearing member projects outwardly from the spaced side surfaces of said corner part to which said bearing member is secured.

9. Honeycomb frame for beehives, as set forth in claims 4 or 5, wherein each said bearing member projects outwardly from the spacer surfaces on the spaced side surfaces of said corner part to which said bearing member is secured.

10. Honeycomb frame for beehives, as set forth in claim 1, wherein each said sleeve portion of said corner part has a toothed rack in the inner surface thereof, and each said flat bar has complementary teeth formed on the inner surface thereof extending in the elongated direction thereof from the second end of said flat bar with said teeth arranged to interfit with said toothed rack in said sleeve part into which said flat bar is received.

11. Honeycomb frame for beehives, as set forth in claim 1, wherein each said corner part has a right-angled outer surface with one part of said outer surface extending generally perpendicularly to the other part thereof, a discharge bore formed in the part of said corner part extending in alignment with said flat bar integrally secured thereto, said discharge bore extending inwardly toward said sleeve portion in said corner part so that it is directed toward the end of said flat bar received in said sleeve portion.

12. Honeycomb frame for beehives, as set forth in claim 1, wherein each said flat bar has a pair of spaced side surfaces extending between the inner and outer surfaces thereof and chamfered surfaces joining the outer surface of said flat bar with said spaced side surfaces.

13. Honeycomb frame for beehives, as set forth in claim 1, wherein said sectional members are injection molded from a plastics material.

14. Honeycomb frame for beehives, as set forth in claim 1, wherein said sectional members are injection molded from a foamed plastics material.

* * * * *

UNITED STATES PATENT OFFICE
CERTIFICATE OF CORRECTION

Patent No. 4,216,557          Dated August 12, 1980

Inventor(s) Hans-Dieter Golde

It is certified that error appears in the above-identified patent and that said Letters Patent are hereby corrected as shown below:

In the heading of the Patent [30] should read as follows:

[30]   Foreign Application Priority Data

Oct. 5, 1977............Fed. Rep. of Germany 2744741.

Signed and Sealed this

Eighteenth Day of November 1980

[SEAL]

Attest:

SIDNEY A. DIAMOND

Attesting Officer    Commissioner of Patents and Trademarks